United States Patent
Dawkins et al.

(10) Patent No.: US 7,844,903 B2
(45) Date of Patent: Nov. 30, 2010

(54) SYSTEM AND METHOD OF AUTOMATICALLY GENERATING ANIMATED INSTALLATION MANUALS

(75) Inventors: William P. Dawkins, Jonestown, TX (US); Stephen G. Luning, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 787 days.

(21) Appl. No.: 11/753,960

(22) Filed: May 25, 2007

(65) Prior Publication Data

US 2008/0294995 A1 Nov. 27, 2008

(51) Int. Cl.
G06F 3/00 (2006.01)
(52) U.S. Cl. ...................................................... 715/735
(58) Field of Classification Search .................. None
See application file for complete search history.

(56) References Cited

U.S. PATENT DOCUMENTS

| | | | |
|---|---|---|---|
| 6,247,128 B1 | 6/2001 | Fisher et al. | |
| 7,356,773 B1 * | 4/2008 | Barraclough | 715/762 |
| 7,554,522 B2 * | 6/2009 | Sinclair et al. | 345/156 |
| 2002/0091805 A1 * | 7/2002 | Phillips et al. | 709/220 |
| 2004/0039561 A1 | 2/2004 | Montano | |
| 2004/0221239 A1 * | 11/2004 | Hachigian et al. | 715/762 |
| 2005/0198631 A1 | 9/2005 | Bisher et al. | |
| 2005/0203756 A1 | 9/2005 | Pirich, Jr. et al. | |
| 2006/0098685 A1 * | 5/2006 | Mase et al. | 370/467 |
| 2006/0230420 A1 * | 10/2006 | Kawai et al. | 725/105 |
| 2006/0277542 A1 * | 12/2006 | Wipfel | 717/174 |
| 2007/0028229 A1 | 2/2007 | Knatcher | |
| 2007/0180509 A1 * | 8/2007 | Swartz et al. | 726/9 |
| 2008/0201303 A1 * | 8/2008 | Bragiel et al. | 707/3 |
| 2009/0158216 A1 * | 6/2009 | Zhang et al. | 715/835 |
| 2009/0259972 A1 * | 10/2009 | Kodosky et al. | 715/810 |

OTHER PUBLICATIONS

U.S. Appl. No. 10/755,791, filed Jan. 12, 2004.
U.S. Appl. No. 10/796,390, filed Mar. 9, 2004.

* cited by examiner

Primary Examiner—Ryan F Pitaro
(74) Attorney, Agent, or Firm—Larson Newman & Abel, LLP

(57) ABSTRACT

An information management system is disclosed and includes a bootstrap server and at least one additional component. Further, the system includes an animated installation manual file stored within the bootstrap server. The animated installation manual is configured to be presented to a user upon an initial boot of the bootstrap server. Additionally, the animated installation manual can be automatically generated based on configuration information received from the user.

20 Claims, 5 Drawing Sheets

SYSTEM AND METHOD OF AUTOMATICALLY GENERATING ANIMATED INSTALLATION MANUALS

FIELD OF THE DISCLOSURE

The present disclosure relates generally to information handling systems. More specifically, the present disclosure relates to providing installation manuals for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system can include multiple servers and one or more disk storage units. As the number of servers and disk storage units within a particular information handling system increases, the complexity of installing and operating the information handling system can also increase. Due to the difficulty in setting up such an information handling system, a typical user may hire a consultant to help with the set up. Due to cost constraints, hiring a consultant may not be desirable for some users.

Accordingly, there is a need for an improved method of providing installation manuals for information handling systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

An information management system is disclosed and includes a bootstrap server and at least one additional component. Further, the system includes an animated installation manual file stored within the bootstrap server. The animated installation manual is configured to be presented to a user upon an initial boot of the bootstrap server.

In another embodiment, a bootstrap server is disclosed and includes an animated instruction manual. Upon an initial boot of the bootstrap server, the animated instruction can be presented to the user via a monitor connected to the bootstrap server.

In yet another embodiment, a method of automatically generating an animated instruction manual is disclosed. The method can include receiving customer configuration information, generating an equipment list at least partially based on the customer configuration information, and generating the animated instruction manual for the equipment list.

As indicated above, the following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Figure 1:
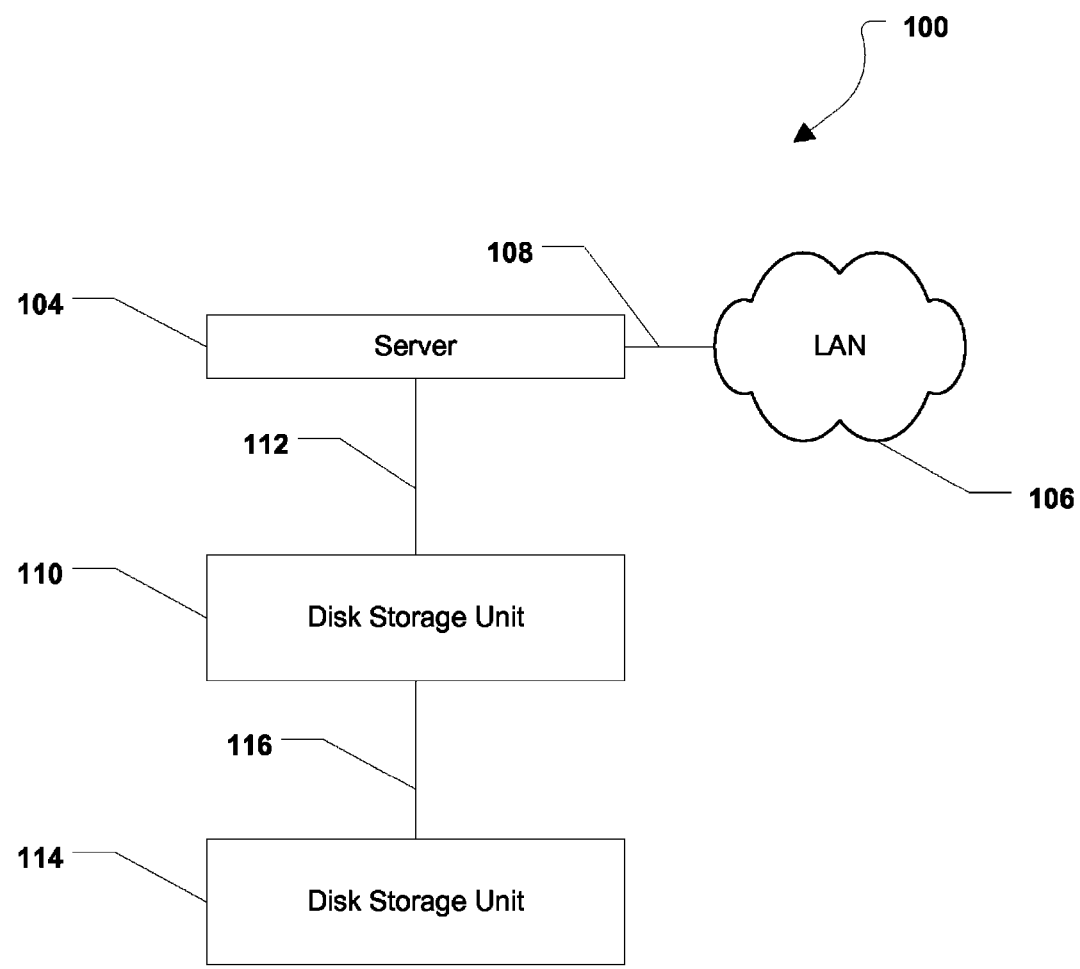
FIG. 1 is a general diagram illustrating a first exemplary information handling system.
Figure 2:
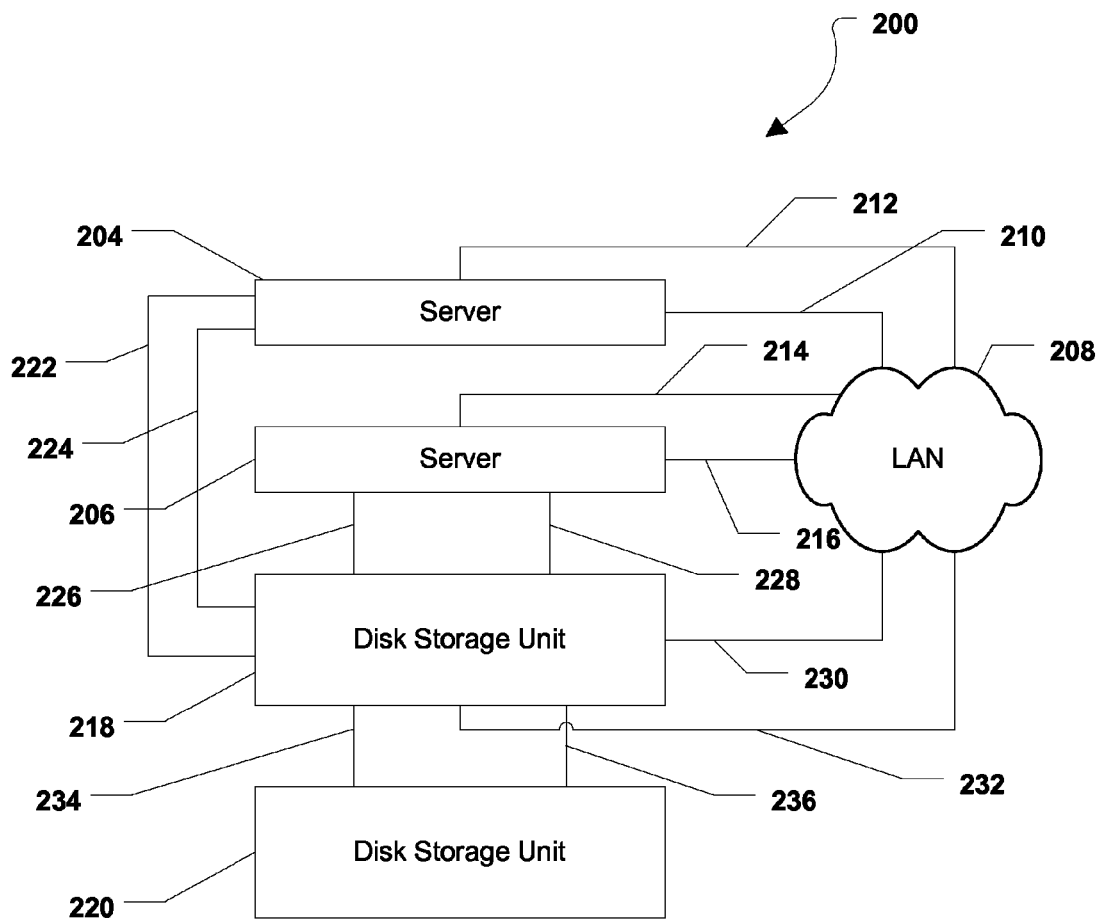
FIG. 2 is a general diagram illustrating a second exemplary information handling system.

FIG. 1 depicts an exemplary information handling system without redundancy. FIG. 2 depicts an exemplary information handling system with redundancy. Each system is an example of an information handling system that a user may desire to purchase and assemble using the animated installation manual described herein.

Referring to FIG. 1, a first exemplary information handling system is shown and is generally designated 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In a particular embodiment, as shown in FIG. 1, the information handling system 100 can include a server 104. The server 104 can be coupled to a local area network (LAN) 106 via a LAN connection 108. FIG. 1 also shows a first disk storage unit 110 that can be coupled to the server 104 via a server connection 112. A second disk storage unit 114 can be coupled to the first disk storage unit 110 via a disk storage unit connection 116.

Referring to FIG. 2, a second exemplary information handling system is shown and is generally designated 200. The information handling system 200, shown in FIG. 2, can include a first server 204 and a second server 206. The first server 204 can be connected to a LAN 208 via a first LAN connection 210 and a second LAN connection 212. The second server 206 can also be connected to the LAN 208 via a third LAN connection 214 and a fourth LAN connection 216.

FIG. 2 also shows that the information handling system 100 can include a first disk storage unit 218 and a second disk storage unit 220. The first disk storage unit 218 can be connected to the first server 204 via a first server connection 222 and a second server connection 224. The first disk storage unit 218 can also be connected to the second server 206 via a third server connection 226 and a fourth server connection 228. Moreover, the first disk storage unit 218 can be connected to the LAN 208 via a fifth LAN connection 230 and a sixth LAN connection 232.

As shown in FIG. 2, the second disk storage unit 220 can be coupled to the first disk storage unit 218 via a first storage disk unit connection 234 and a second disk storage unit connection 236. The information handling system 200 shown in FIG. 2 can be considered a redundant system without a single point of failure. In other words, each connection is mirrored by a second similar connection. Further, the second server 206 can act as a backup server, or redundant server, to the first server 204.

When a user purchases an information handling system, e.g., one of the systems described above, he or she can be provided with written instruction indicating which server is the bootstrap server—if the system includes multiple servers. The user can be given further instruction to connect the bootstrap server to a monitor and boot the bootstrap server. Upon the initial boot of the bootstrap server, an animated installation manual can be broadcast to the user via the monitor. The animated installation manual can guide the user through the additional steps necessary to complete the installation of the information handling system, e.g., how to interconnect the subcomponents of the system, how to connect the subcomponents to a network, etc.

Figure 3:
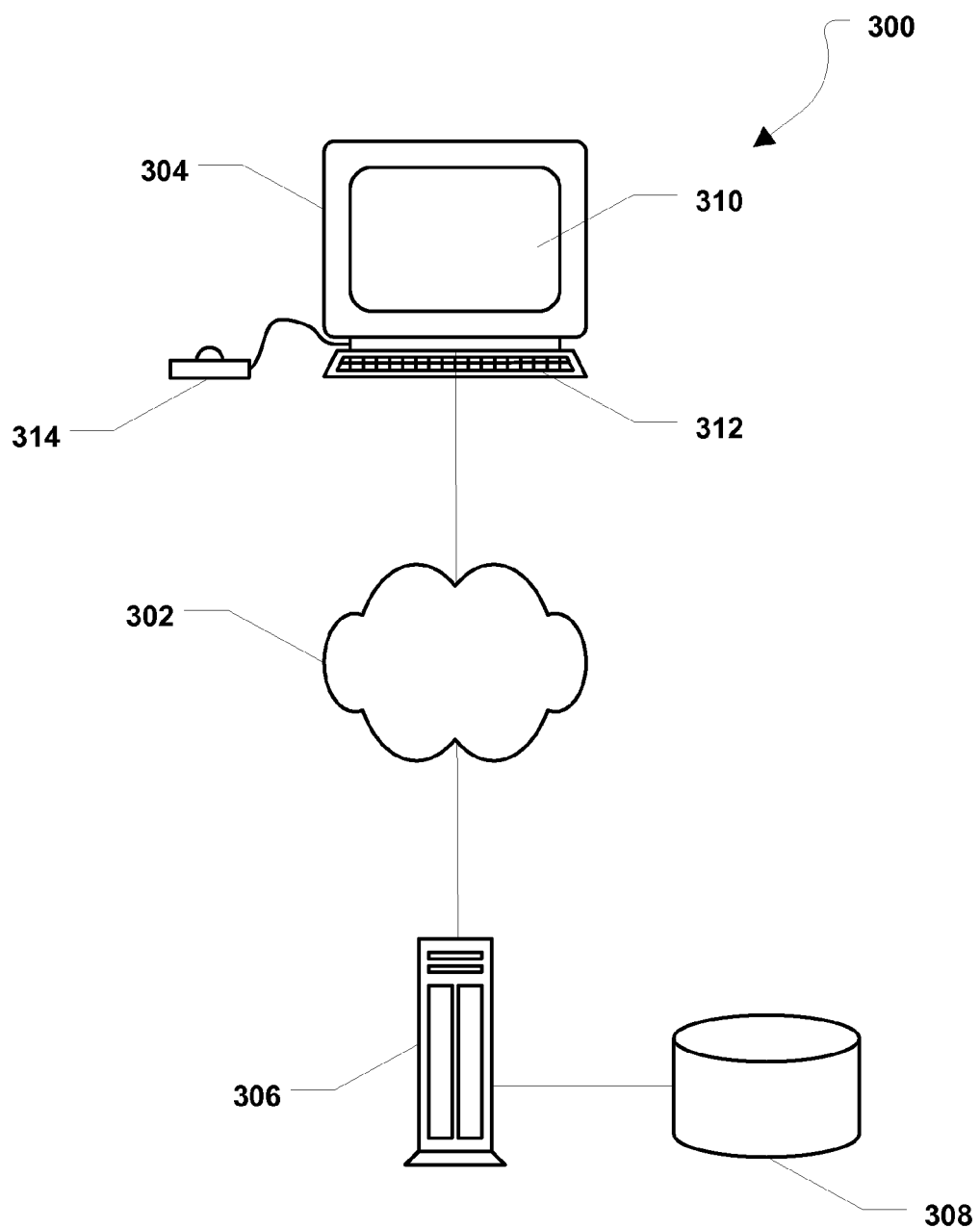
FIG. 3 is a general diagram illustrating a computer system.

FIG. 3 illustrates a computer system 300. As shown, the system 300 can include a network 302, e.g., the Internet. Further, at least one user computer 304 can be connected to the network 302. Further, a server 306 can be connected to the network 302. A database 308 can be connected to the server 306. The user computer 304 can include a monitor 310, a keyboard 312, and a mouse 314. A user can use the user computer 304 to access a sales system provided by the server 306.

In a particular embodiment, the server 306 can include computer-executable code, or a program, that can perform the method described below. For example, using the user computer 304, a user can input an order for an information handling system to the server 306, e.g., one of the systems 100, 200 described above. Based on the order, the server 306 can create an animated installation manual that can be sent to the user with the information handling system. In particular, the server 306 can upload the animated installation manual to a bootstrap server, e.g., server 104 in FIG. 1 or one of the servers 204, 20 in FIG. 2, with an instruction to turn on the bootstrap server first in order to view the animated installation manual. The animated installation manual can then guide the user through the installation process and can indicate to the user a particular order to connect the additional components of the information handling system. Also, the animated installation manual can provide the user with details concerning the specific connections, and the specific connecting cords, required to assemble the information handling system.

Figure 4:
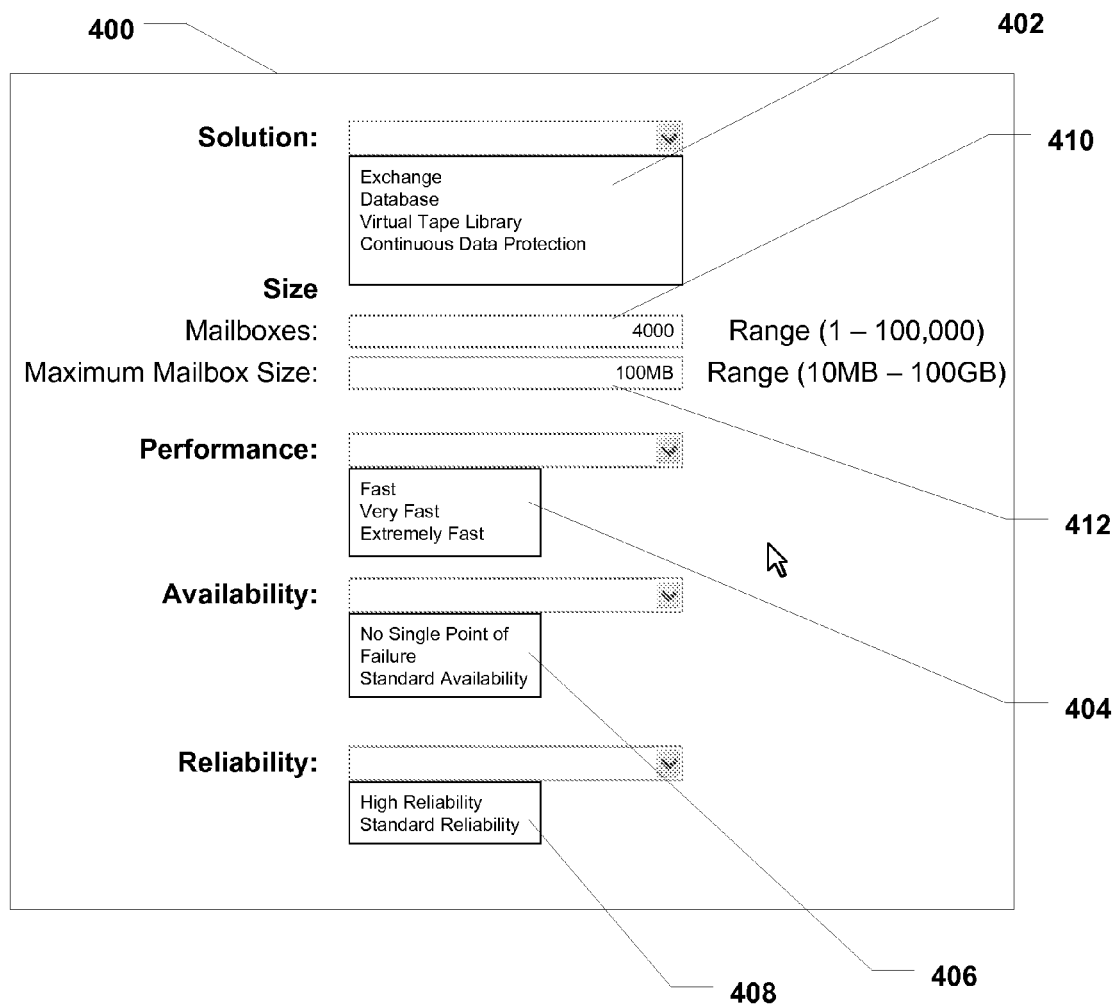
FIG. 4 is a diagram illustrating a user interface.

Referring now to FIG. 4, a user interface that can be used to input user specified system information is shown and is generally designated 400. The user interface can be presented to a user via a computer, e.g., the user computer 304 shown in FIG. 3. The user interface 400 can include a solution, or configuration, drop-down menu 402, a performance drop-down menu 404, an availability drop-down menu 406, and a reliability drop-down menu 408. Other selections, or inputs, may be presented based on selections or combinations of selections made using the drop-down menus 402, 404, 406, 408. For example, if "Exchange" is selected from the solution drop-down menu 402, additional drop-down menus, or input windows, can be presented. For example, the user interface 400 can also include a mailboxes input window 410, or drop-down menu, and a maximum mailbox size input window 412, or drop-down menu.

A user can use the solution drop-down menu 402 to choose a particular type of information handling system, e.g., an exchange system, a database system, a virtual tape library, a continuous data protection system, or a combination thereof. Also, the user can use the performance drop-down menu 404 in order to select the type of performance the user expects from the information handling system. For example, the user can select fast, very fast, or extremely fast. The user can use the availability drop-down menu 406 to select the type of availability provided by the information handling system. For example, the user can select standard availability, e.g., a system similar to the system shown in FIG. 1, or no single point of failure, e.g., a system similar to the system shown in FIG. 2. Further, the user can use the reliability drop-down menu 408 in order to select the reliability of the information handling system, e.g., high reliability or standard reliability.

In an exemplary embodiment, if "Exchange" is selected from the solution drop-down menu 402, the user can input a particular number of desired mailboxes via the mailbox input window 410. For example, the range of available mailboxes can be in a range of one to one hundred thousand (1-1000). The user can also input a maximum mailbox size for each mailbox via the maximum mailbox size window 412. For example, the maximum mailbox size for each mailbox can be in a range of ten megabytes to one hundred gigabytes (10 MB-100 GB).

In a particular embodiment, the user interface 400 can also indicate to the user a relative price, or actual price, associated with each selection provided by the user interface 400. For example, the user interface 400 can indicate that the extremely fast performance is more expensive than the very fast performance, which, in turn, is more expensive than the fast performance. Also, the user interface 400 can indicate that the no single point of failure availability is more expensive than the standard availability. Moreover, the user interface 400 can indicate that the high reliability is more expensive than the standard reliability.

After the user has made his or her selections regarding the information handling system, the user interface can indicate an approximate cost. Thereafter, the user can be provided with a chance to accept, or finalize, the selected information handling system or with a chance to amend his or her selections.

Figure 5:
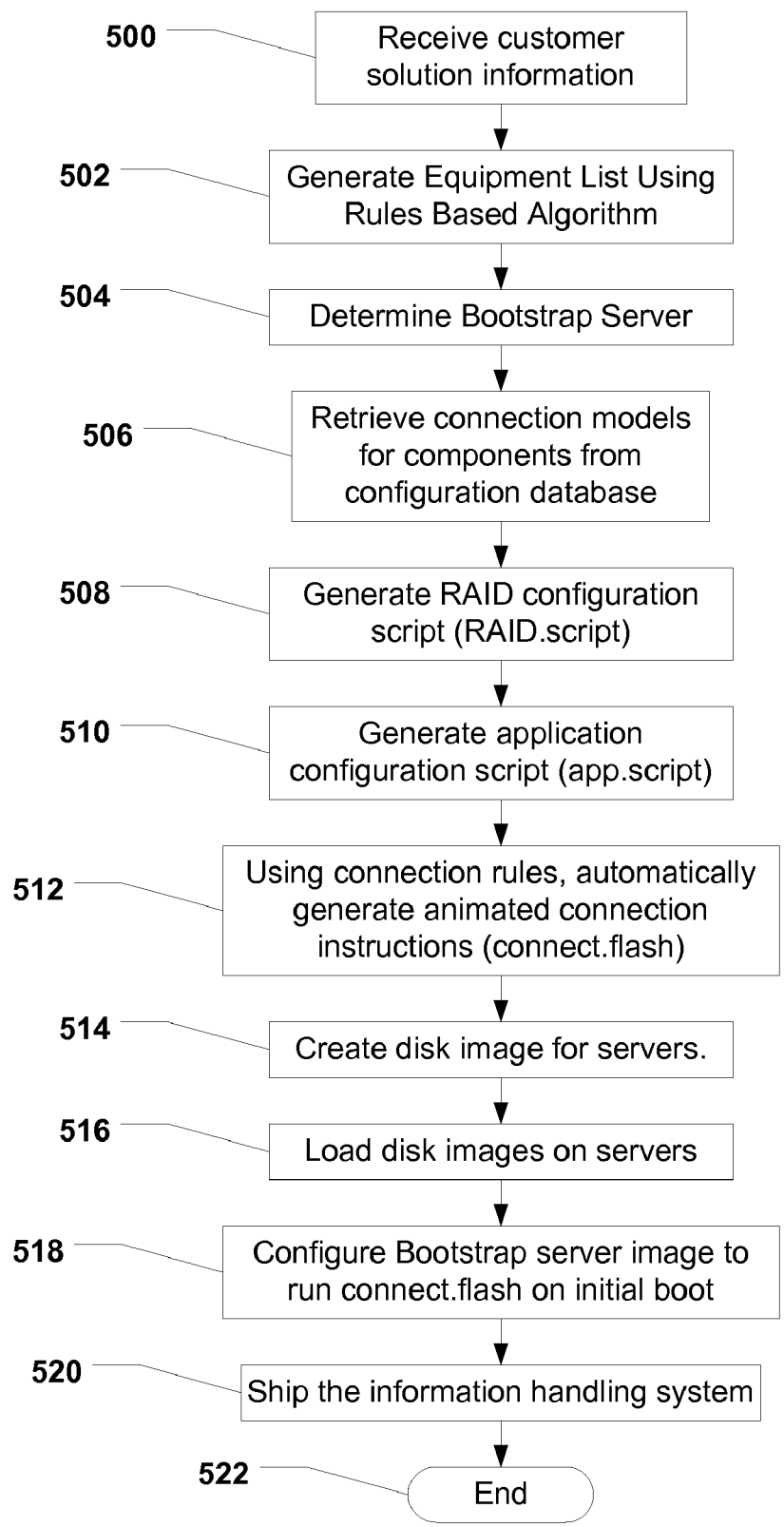
FIG. 5 is a flow chart illustrating a method of automatically generating animated installation manuals.

Referring to FIG. 5, a method of automatically generating an animated installation menu is shown and commences at block 500. At block 500, customer configuration information can be received, e.g., at a server. The customer configuration information can include the information input via the user interface described in conjunction with FIG. 4 and can include a particular information handling system selected by the user. At block 502, an equipment list for the customer-selected system can be generated using a rules based algorithm. The rules based algorithm can determine the appropriate equipment based on the customer selections and the available equipment.

Moving to block 504, the bootstrap server can be determined. In a particular embodiment, the bootstrap server is the server that will include the animated installation manual. The user can be provided an instruction with the information handling system to connect the bootstrap server to a monitor and start the bootstrap server first. Thereafter, when the bootstrap server is booted, the animated installation manual can be broadcast, or otherwise shown, to the user via the monitor. The user can then follow the steps provided by the animated installation manual in order to complete the installation and connection of the information handling system. The bootstrap server can also include and execute all configuration scripts, described below.

Proceeding to block 506, the server can retrieve one or more connection models for the components of the information handling system ordered by the user. Then, at block 508, the server can generate a redundant array of independent disks (RAID) configuration script (RAID.script) for the information handling system ordered by the user. The RAID.script can be used to configure the RAID subsystem within the information handling system. The RAID.script can configure the correct number and types of RAID storage volumes needed by the information handling system requested by the user.

At block 510, the server can generate an application configuration script (app.script) for the information handling system ordered by the user. The app.script can initialize the application, or applications, included in the information handling system. For example, if the information handling system includes an Exchange system, the app.script can run the commands necessary to initialize mailboxes or the app.script can run the commands that are necessary to set the application to run in a clustered mode.

At block 512, using the connection rules for the information system order by the user, the server can automatically generate an animated installation manual (connect.flash). When the bootstrap server is booted for the first time at the user's location, the animated installation manual can be presented to the user first and the animated installation manual can instruct the user how to connect the additional components to the bootstrap server and to each other. Further, the animated installation manual can execute the RAID.script and the app.script after all of the connections are made according to the animated installation manual.

Continuing to block 514, the server can create a disk image for each server in the information handling system. At block 516, the server can load the disk images on to each server in the information handling system. Moving to block 518, the bootstrap server can be configured to run the connect.flash file on the initial boot of the bootstrap server. At block 520, the components of the user-selected information handling system can be shipped. The method can then end at state 522.

With the configuration of structure described herein, the system and method described herein can generate an animated installation manual based on a user-selected information handling system. Further, the system and method can provide a user with an animated installation manual that is tailored to the specific information handling system ordered by the user. When the user receives the information handling system, the user can be provided with an instruction to connect the bootstrap server to a monitor and boot the bootstrap server. Upon the initial boot of the bootstrap server, the bootstrap server can run a connect.flash file. The connect.flash file can provide an animated installation manual to the user via the monitor. The animated installation manual can provide specific instructions to the user concerning the set-up and connections required for the information handling system selected by the user. The user can follow the steps provided by the animated installation manual in order to set-up the information handling system. As such, the need for the user to hire a consultant to assist in configuring the information handling system is obviated and the costs associated with the information handling system can be substantially minimized.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information management system, comprising:
    a bootstrap server;
    at least one additional component; and
    an animated installation manual file stored within the bootstrap server, wherein the animated installation manual:
        indicates to a user how to interconnect the bootstrap server and the at least one additional component to form a redundant system such that there is no single point of failure between the bootstrap server and the at least one additional component; and
        is configured to be present to a user upon an initial boot of the bootstrap server.

2. The information management system of claim 1, wherein the animated installation manual indicates to the user how to connect the bootstrap server, the at least one additional component, or a combination thereof to a local area network.

3. The information management system of claim 2, wherein the animated installation manual is automatically generated based on configuration information received from the user.

4. The information management system of claim 3, wherein the configuration information includes configuration type, performance type, availability type, reliability type, a mailbox number, a maximum mailbox size, or a combination thereof.

5. The information management system of claim 4, wherein the configuration information is received via a network connection and wherein the animated installation manual is automatically generated based on the configuration information and uploaded to the bootstrap server.

6. A bootstrap server, comprising:
    an animated instruction manual, wherein upon an initial boot of the bootstrap server, the animated instruction manual:
        indicates to a user how to interconnect the bootstrap server and at least one additional component to form a redundant system such that there is no single point of failure between the bootstrap server and the at least one additional component; and
        is presented to the user via a monitor connected to the bootstrap server.

7. The bootstrap server of claim 6, wherein the animated instruction manual is generated at a separate server and uploaded to the bootstrap server before the bootstrap server is shipped to a user.

8. The bootstrap server of claim 7, wherein the animated installation manual is generated based on configuration information received from the user.

9. The bootstrap server of claim 8, wherein the configuration information includes configuration type, performance type, availability type, reliability type, a mailbox number, a maximum mailbox size, or a combination thereof.

10. The bootstrap server of claim 6, wherein the animated instruction manual indicates how to connect the bootstrap server to a network.

11. The bootstrap server of claim 6, wherein the animated instruction manual comprises a flash file and the bootstrap server is configured to execute the flash file on the initial boot of the bootstrap server.

12. A method of automatically generating an animated instruction manual, the method comprising:
receiving customer configuration information for an information handling system, the information handling system including:
a bootstrap server; and
at least one additional component;
generating an equipment list at least partially based on the customer configuration information including:
the bootstrap server; and
the at least one additional component; and
generating the animated instruction manual for the equipment list, wherein the animated instruction manual indicates to a user how to interconnect the bootstrap server and at least one additional component to form a redundant system such that there is no single point of failure between the bootstrap server and the at least one additional component.

13. The method of claim 12, further comprising:
generating a redundant array of independent disks (RAID) configuration script.

14. The method of claim 13, further comprising:
generating an application configuration script.

15. The method of claim 12, further comprising:
uploading the animated instruction manual to the bootstrap server.

16. The method of claim 15, further comprising:
configuring the bootstrap server to execute the animated instruction manual upon an initial boot of the bootstrap server.

17. The information management system of claim 1, further comprising:
a second server;
wherein the animated installation manual further indicates to the user how to interconnect the bootstrap server, the second server, and the at least one additional component to form a redundant system such that there is no single point of failure between the bootstrap server, the second server, and the at least one additional component.

18. The information management system of claim 1, wherein the animated installation manual includes a configuration script to set up a redundant array of independent disks.

19. The bootstrap server of claim 6, wherein the animated installation manual includes:
a first configuration script to set up a redundant array of independent disks; and
a second configuration script to initialize an application on the bootstrap server.

20. The method of claim 12, wherein the customer configuration information includes configuration type, performance type, availability type, reliability type, a mailbox number, a maximum mailbox size, or a combination thereof.

* * * * *